United States Patent
Itzkowitz et al.

(10) Patent No.: US 11,859,828 B2
(45) Date of Patent: Jan. 2, 2024

(54) TOASTER OVEN

(71) Applicant: The Steelstone Group LLC, Brooklyn, NY (US)

(72) Inventors: Binyumen Itzkowitz, Brooklyn, NY (US); Kalman M. Wertzberger, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 0 days.

(21) Appl. No.: 17/944,845

(22) Filed: Sep. 14, 2022

(65) Prior Publication Data

US 2023/0003394 A1 Jan. 5, 2023

Related U.S. Application Data

(63) Continuation of application No. 16/751,563, filed on Jan. 24, 2020, now Pat. No. 11,448,404.

(60) Provisional application No. 62/796,446, filed on Jan. 24, 2019.

(51) Int. Cl.
| | |
|---|---|
| F24C 15/32 | (2006.01) |
| A21B 3/04 | (2006.01) |
| A21B 1/26 | (2006.01) |
| A21B 1/24 | (2006.01) |
| A47J 37/06 | (2006.01) |

(52) U.S. Cl.
CPC ............ *F24C 15/322* (2013.01); *A21B 1/245* (2013.01); *A21B 1/26* (2013.01); *A21B 3/04* (2013.01); *A47J 37/0641* (2013.01)

(58) Field of Classification Search
CPC .... F24C 15/322; F24C 15/325; F24C 15/327; F24C 15/003; A21B 1/245; A21B 1/26; A21B 3/04; A47J 37/0641
See application file for complete search history.

(56) References Cited

U.S. PATENT DOCUMENTS

| | | | |
|---|---|---|---|
| 4,624,301 | A | 11/1986 | Baggott et al. |
| 4,781,169 | A | 11/1988 | Henke et al. |
| 6,252,201 | B1 | 6/2001 | Nevarez |
| 6,833,533 | B1 | 12/2004 | Wolfe et al. |

(Continued)

FOREIGN PATENT DOCUMENTS

WO 01/82653 A1 11/2001

OTHER PUBLICATIONS

Non-Final Office Action issued for U.S. Appl. No. 16/751,563 electronically dated Sep. 9, 2021.

(Continued)

*Primary Examiner* — John J Norton
*Assistant Examiner* — Franklin Jefferson Wang
(74) *Attorney, Agent, or Firm* — Myers Wolin, LLC

(57) ABSTRACT

An embodiment of the present disclosure provides a toaster oven including: a cooking chamber; an air passage; and a fan. The cooking chamber includes a side wall and a top wall. One of the side wall and the top wall is provided with an air inlet in communication with a cooking space of the cooking chamber. The other of the side wall and the top wall is provided with an air outlet in communication with the cooking space. The air passage between the air inlet and the air outlet is disposed outside the cooking chamber. The fan blows air from the air inlet to the air outlet through the air passage.

12 Claims, 2 Drawing Sheets

(56) References Cited

U.S. PATENT DOCUMENTS

| | | | |
|---|---|---|---|
| 2008/0092754 A1* | 4/2008 | Noman | A21B 1/245 |
| | | | 99/443 C |
| 2009/0194092 A1 | 8/2009 | Shon et al. | |
| 2010/0282097 A1 | 11/2010 | Schulte | |
| 2013/0175253 A1* | 7/2013 | Shei | A47J 39/003 |
| | | | 219/400 |
| 2014/0261371 A1* | 9/2014 | Van Camp | A21B 1/48 |
| | | | 99/443 C |
| 2016/0356506 A1 | 12/2016 | McKee et al. | |
| 2018/0020681 A1* | 1/2018 | Froelicher | A21B 1/26 |
| | | | 219/392 |
| 2021/0207812 A1 | 7/2021 | Bhogal et al. | |

OTHER PUBLICATIONS

Final Office Action issued for U.S. Appl. No. 16/751,563 electronically dated Mar. 1, 2022.

Notice of Allowance issued for U.S. Appl. No. 16/751,563 electronically dated May 17, 2022.

* cited by examiner

TOASTER OVEN

CROSS REFERENCES TO RELATED APPLICATIONS

This application is a continuation application of U.S. patent application Ser. No. 16/751,563, filed on Jan. 24, 2020, and claims the benefit of U.S. Provisional Patent Application No. 62/796,446, filed on Jan. 24, 2019, the contents of each of which are incorporated herein by reference.

FIELD

The present disclosure generally relates to a toaster oven.

BACKGROUND

Toaster ovens are now popular cooking appliances. Food inside cooking chambers of the ovens can be heated with great ease.

SUMMARY

An embodiment of the present disclosure provides a toaster oven including: a cooking chamber; an air passage; and a fan. The cooking chamber includes a side wall and a top wall. One of the side wall and the top wall is provided with an air inlet in communication with a cooking space of the cooking chamber. The other of the side wall and the top wall is provided with an air outlet in communication with the cooking space. The air passage between the air inlet and the air outlet is disposed outside the cooking chamber. The fan blows air from the air inlet to the air outlet through the air passage.

In another embodiment of the present disclosure, the air inlet is in the side wall and the air outlet is in the top wall.

In another embodiment of the present disclosure, the air inlet is disposed only in a bottom half area of the side wall.

In another embodiment of the present disclosure, the air outlet includes a plurality of air outlet holes that are spaced apart from each other in a horizontal direction.

In another embodiment of the present disclosure, the air outlet holes are arranged such that length of air outlet holes are increased as the air outlet holes are distant from the side wall.

In another embodiment of the present disclosure, the toaster oven further includes a heating element extending in a horizontal direction. The air outlet extends over the heating element in the horizontal direction.

In another embodiment of the present disclosure, wherein the air passage includes a side air passage part and a top air passage part. The side wall is disposed between the cooking space and the side air passage part. The top air passage part is in communication with the side air passage part. The top wall is disposed between the cooking space and the top air passage part, In another embodiment of the present disclosure, the top air passage part includes two air paths that are separated from each other by a part of the top wall. Each of the two air paths is in communication with a part of the air outlet.

DETAILED DESCRIPTION OF THE PREFERRED EMBODIMENTS

Figure 1:
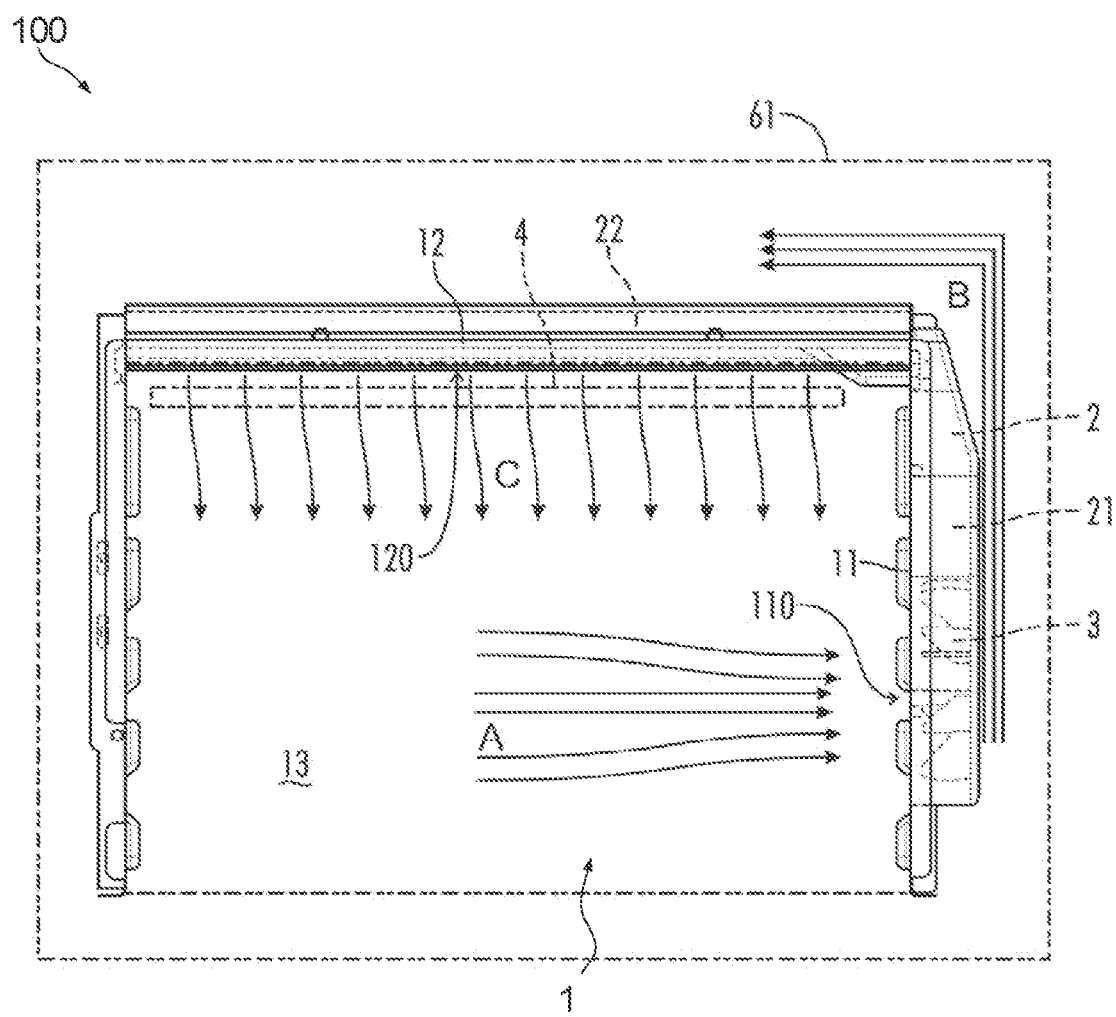
FIG. 1 illustrates a schematic front view of a toaster oven according to one embodiment.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 2:
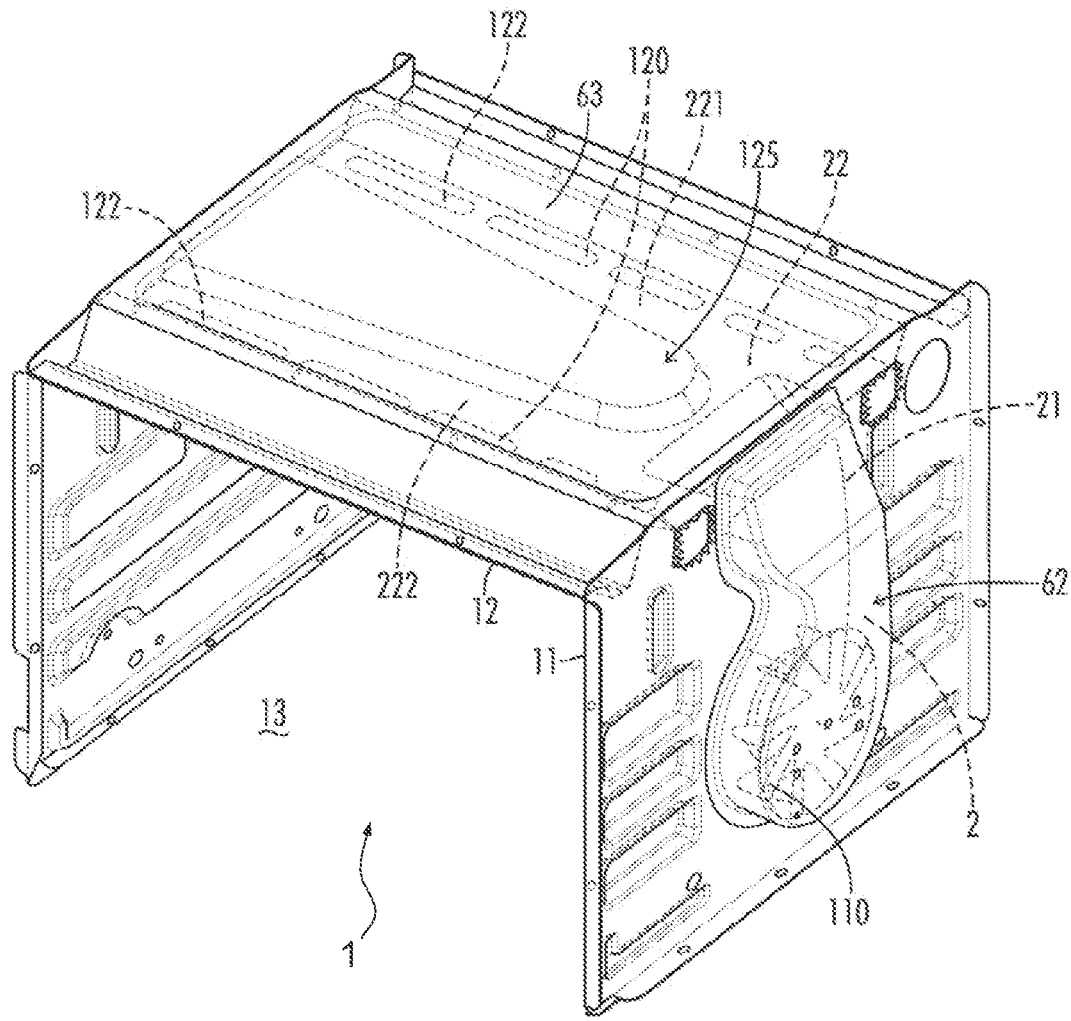
FIG. 2 illustrates a semi-exploded view of a toaster oven according to one embodiment.

FIG. 1 illustrates a schematic front view of a toaster oven according to one embodiment. FIG. 2 illustrates a semi-exploded view of a toaster oven according to one embodiment.

A toaster oven 100 in FIGS. 1 and 2 may include a cooking chamber 1, an air passage 2, a fan 3, and at least one heating element 4. The cooking chamber 1 may include a cooking space 13 in which foods may be cooked by being toasted. The toaster oven 100 may further include a housing 61 that accommodates the cooking chamber 1, a front door (not shown), and at least one food rack (not shown). An air inlet 110 and an air outlet 120 are further provided, and the air passage 2 transports air from the air inlet to the air outlet.

The cooking chamber 1 may include at least one side wall 11 and a top wall 12. The side wall 11 may be provided with an air inlet 110 in communication with the cooking space 13 of the cooking chamber 1. In a non-limiting example, the air inlet 110 may be disposed in a bottom half area of the side wall 11, more particularly only in the bottom half area of the side wall 11.

The top wall 12 may be provided with an air outlet 120 in communication with the cooking space 13 of the cooking chamber 1. In the illustrated example in FIG. 2, the air outlet 120 may include a plurality of air outlet holes 121 and 122. The air outlet holes 121 may be spaced apart from each other in a horizontal direction, and the air outlet holes 122 may be spaced apart from each other in the horizontal direction. The air outlet holes 121 may be arranged such that length of air outlet holes 121 are increased as the air outlet holes 121 are distant from the side wall 11. Similarly, the air outlet holes 122 may be arranged such that length of air outlet holes 122 are increased as the air outlet holes 122 are distant from the side wall 11.

While the embodiment shown provides the air inlet 110 in the side wall 11 and the air outlet 120 in a top wall 12, it will be understood that the air inlet and outlet may be provided on any internal surface of the toaster oven. Accordingly, the inlet may be on a bottom surface of the toaster oven. However, as discussed below, the air inlet 110 is typically located such that it is spaced apart from the air outlet 120.

The air passage 2 may be disposed outside the cooking chamber 1. The air passage 2 may communicate with the air inlet 110 and with the air outlet 120. In this embodiment, the air passage 2 may include a side air passage part 21 and a top air passage part 22. The side air passage part 21 may be formed by the side wall 11 and a shroud 62. The side wall 11 may be disposed between the cooking space 13 and the side air passage part 21. The top air passage part 22 may communicate with the side air passage part 21. The top air passage part 22 may be formed by the top wall 12 and a shroud 63. The top wall 12 may be disposed between the cooking space 13 and the top air passage part 22.

In the illustrated example, the top air passage part 22 may include two air paths 221 and 222 that are separated from each other by a part 125 of the top wall 12. Each of the two air paths 221 and 222 may communicate with a part of the air outlet 120. For example, in FIG. 2, the air paths 221 may communicate with the air outlet holes 121, and the air paths 222 may communicate with the air outlet holes 122.

The fan 3 may blow air from the air inlet 110 to the air outlet 120 through the air passage 2. Similarly, the fan 3 may be designed to suck air from the air inlet 110 such that the air flow in the cooking chamber 1 itself results in circulating air. The heating element 4 shown in FIG. 1 may be disposed in the upper portion of the cooking space 13, and may extend in the horizontal direction. In addition, the air outlet 120 may extend over the heating element 4 in the horizontal direction.

Referring to FIG. 1, there are three stages along the path of the airflow that determine the performance of the design of the toaster oven 100.

In operation of the toaster oven 100, as designated by arrows A in FIG. 1, the air in the cooking space 13 in the cooking chamber 1 may be pulled through the air inlet 110 by the fan 3. As stated above, the air inlet 110 may be disposed in a bottom half area of the side wall 11, more particularly only in the bottom half area of the side wall 11. This configuration may allow the outlet air (as designated by arrows C), to flow down and permeate the cooking chamber 1 without prematurely being sucked into the fan 3. In addition, according to the present configuration, the position of the air inlet 110 can force the air to be pulled through the cooking chamber 1, particularly the middle and bottom sections at a higher pressure than would have been had the air inlet 110 been located elsewhere.

As designated by arrows B, the fan 3 may accelerate the air that gets pulled from the cooking space 13 of the cooking chamber 1 into the side air passage part 21. The air then flows up the side air passage part 21 and into the top air passage part 22, which is a specifically designed duct (see FIG. 2), that splits the air into two paths 221 and 222 to even distribute the air over the heating element 4 along the width of the toaster oven's cooking chamber 1.

As designated by arrows C, the air may be ejected from the top air passage part 22 through the air outlet 120. As discussed above, the air outlet 120 may extend over the heating element 4 in the horizontal direction. This configuration increases the possibility of evenly heating up all the air that exits from the air outlet 120.

The present disclosure may allow an evenly distributed and evenly heated airflow to fill the cooking chamber of the toaster oven, for example, by the specific design of the fan shroud and duct (FIG. 2).

In some embodiments, the toaster oven may incorporate air frying features, such that a combination toaster oven and air fryer may be provided.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A toaster oven comprising:
 a cooking chamber that includes a side wall and a top wall, one of the side wall and the top wall being provided with an air inlet in communication with a cooking space of the cooking chamber, and the other of the side wall and the top wall being provided with an air outlet in communication with the cooking space;
 an air passage between the air inlet and the air outlet disposed outside the cooking chamber; and
 a fan that blows air from the air inlet to the air outlet through the air passage,
 wherein the air outlet includes:
 a plurality of first elongated air outlet holes that are arranged in a first direction that is parallel to the top wall, wherein one of the first elongated air outlet holes is greater in longitudinal length to width ratio than another one of the first elongated air outlet holes that is disposed between the one of the first elongated a it outlet holes a nd the side wall, wherein each of the first elongated air outlet holes is a slot; and a plurality of second elongated air outlet holes that are arranged in the first direction and distant from the pluralityof the first elongated air outlet holesin a second direction that is perpendicular to the first direction and that is parallelto the topwall, wherein the toaster oven further comprises a first air guide surface extending upward from the top wall, and a second air guide surface extending upward from the top wall, wherein a distance, in a width direction ofthe one of the first elongated air outlet holes, between the first air guide surface and the one of the first elongated air outlet holes is decreased as each of the first air guide surface and the one of the first elongated air outlet holes is distant from the side wall, the width direction being perpendicular to a longitudinal direction ofthe one of the first elongated air outlet holes, wherein the second airguide surface isdisposed between each of one of the first elongated air outlet holes and the first air guide surface,and one of the second elongated air outlet holes, wherein a distance, in the second direction, between the first air guide surface and the second air guide surface is increased as each of the first air guide surface and the second air guide surface is distant from the side wall, and wherein the first air guide surface is disposed between one of the first elongated air outlet holes and one of the second elongated air outlet holes.

2. The toaster oven of claim 1, wherein one ofthe second elongated a it outlet holes is greater in longitudinal length to width ratio than another one of the second elongated air outlet holes that is disposed between the one ofthe second elongated air outlet holes and the side wall, wherein each of the second elongated air outlet holes is a slot.

3. The toaster oven of claim 1, wherein a distance in the second direction between the second air guide surface and the one of the second elongated air outlet holes is decreased as each of the second air guide surface and the one of the second elongated air outlet holes is distant from the side wall.

4. The toaster oven of claim 3, wherein a distance in the width direction between the second air guide surface and one of the first elongated air outlet holes is increased as each of the second air guide surface and the one of the first elongated air outlet holes is distant from the side wall.

5. The toaster oven of claim 1, wherein the air inlet is in the side wall and the air outlet is in the top wall.

6. The toaster oven of claim 1, wherein the air inlet is disposed only in a bottom half area of the side wall.

7. The toaster oven of claim 1, further comprising a heating element extending in the first direction, the air outlet extending over the heating element in the first direction.

8. The toaster oven of claim 1, wherein the air passage includes:

a side air passage part, the side wall being disposed between the cooking space and the side air passage part; and a top air passage part in communication with the side air passage part, the top wall being disposed between the cooking space and the top air passage part.

9. The toaster oven of claim 8, wherein the air passage includes an air vent between the side air passage part and the top air passage part, and is formed at least by the top wall.

10. The toaster oven of claim of claim 1, wherein the air passage includes an air vent configured to provide air on the top wall, and wherein the first air guide surface overlaps with the air vent as viewed in the longitudinal direction of the one of the first elongated air outlet holes.

11. The toaster oven of claim 1, wherein the longitudinal direction coincides with the first direction, and the width direction coincides with the second direction.

12. A toaster oven comprising:

a cooking chamber that includes a side wall and a top wall, one of the side wall and the top wall being provided with an air inlet in communication with a cooking space of the cooking chamber, and the other of the side wall and the top wall being provided with an air outlet in communication with the cooking space;

an air passage between the air inlet and the air outlet disposed outside the cooking chamber; and a fan that blows air from the air inlet to the air outlet through the air passage, wherein the air outlet includes:

a plurality of first elongated air outlet holes that are arranged in a first direction that is parallel to the top wall, wherein one of the first elongated air outlet holes is greater in longitudinal length to width ratio than another one of the first elongated air outlet holes that is disposed between the one ofthe first elongated air outlet holes and the side wall, wherein each of the first elongated air outlet holes is a slot; and a plurality of second elongated air outlet holes that are arranged in the first direction and distant from the plurality of the first elongated air outlet holesin a second direction that is perpendicular to the first direction and that is parallel to the top wall, wherein the toaster oven further comprises a firsta irguide surface extending upward from the top wall, and a second air guide surface extending upward from the topwall, wherein the one of the first elongated air outlet holes is configured to change, to a downward direction that passes through the top wall, a direction of air that is guided by the first air guide surface and the top wall, wherein the second airguide surface isdisposed between each of one of the first elongated air outlet holes and the first air guide surface,and one of the second elongated air outlet holes, wherein a distance, in the second direction, between the first airguide surface and the second air guide surface is increased as each of the first air guide surface and the second air guide surface is distant from the side wall, and wherein the first airguide surface is disposed between one of the first elongated air outlet holes and one of the second elongated air outlet holes.

* * * * *